United States Patent [19]

Takahashi

[11] Patent Number: 4,779,697

[45] Date of Patent: Oct. 25, 1988

[54] RIDING-ASTRIDE TYPE WHOLE-WHEEL STEERED VEHICLE

[75] Inventor: Hirotake Takahashi, Saitama, Japan

[73] Assignee: Honda Giken Kogyo Kabushiki Kaisha, Tokyo, Japan

[21] Appl. No.: 873,193

[22] Filed: Jun. 11, 1996

[30] Foreign Application Priority Data

Jun. 18, 1985 [JP] Japan .................. 60-132150

[51] Int. Cl.$^4$ ........................................ B60K 17/358
[52] U.S. Cl. .................... 180/236; 180/140; 280/91
[58] Field of Search ............... 180/234, 236, 240, 241, 180/140; 280/91

[56] References Cited

U.S. PATENT DOCUMENTS

| | | | |
|---|---|---|---|
| 1,323,126 | 11/1919 | Tolson | 180/240 |
| 2,334,980 | 11/1943 | Allen | 180/240 |
| 3,282,366 | 11/1966 | Sprague | 180/240 |
| 3,392,987 | 7/1968 | Müller et al. | 280/91 |
| 3,596,730 | 8/1971 | Cecce | 180/236 |
| 4,295,657 | 10/1981 | Sano et al. | 280/91 |

FOREIGN PATENT DOCUMENTS

| | | | |
|---|---|---|---|
| 59-26363 | 10/1984 | Japan | 280/91 |
| 59-192685 | 11/1984 | Japan | |
| 2044699 | 10/1980 | United Kingdom | 280/91 |

Primary Examiner—David M. Mitchell
Assistant Examiner—Charles R. Watts
Attorney, Agent, or Firm—Bogucki, Scherlacher, Mok & Roth

[57] ABSTRACT

A riding-astride type whole-wheel steered vehicle (100; 200) comprising front wheels (2) and rear wheels (3) attached to the front part and the rear part of a vehicle body frame (1), respectively, a power transmission mechanism (8, 11, 21) for transmitting power of a midship engine (5), which is mounted on the vehicle body frame between axles (13, 14, 16 and 23, 24, 26) of the wheels in terms of the longitudinal direction of the vehicle, to at least either of the axles, left and right footsteps (7) attached to the vehicle body frame at both sides of the engine, respectively, a front-wheel steering mechanism (29) for interconnecting a handle member of the vehicle with the front wheels and steering the front wheels, a rear-wheel steering mechanism (19) for steering the rear wheels, and a steering transmission mechanism (34) for mechanically interconnecting the front-wheel steering mechanism with the rear-wheel steering mechanism. The power transmission mechanism (8, 11, 21) and the steering transmission mechanism (34) are arranged, within a transverse distance between the left and right footsteps (7), at one side of the engine (5) and at the other side thereof, respectively.

6 Claims, 4 Drawing Sheets

RIDING-ASTRIDE TYPE WHOLE-WHEEL STEERED VEHICLE

BACKGROUND OF THE INVENTION

1. Field of the Invention

The present invention generally relates to a vehicle capable of whole-wheel steering. More particularly, the invention relates to a riding-astride type whole-wheel steered vehicle on which a driver rides astride.

2. Description of Relevant Art

In Japanese Patent Application Lay-Open Print No. 59-192685, laid open on Nov. 1, 1984, there is disclosed a riding-astride type whole-wheel steered vehicle including a vehicle body frame, front wheels attached through a front axle to the front part of the vehicle body frame, rear wheels attached through a rear axle to the rear part of the vehicle body frame, a midship engine mounted on the vehicle body frame between the axles in the longitudinal direction of the vehicle, a power transmission mechanism for transmitting power of the engine to at least either of the front and rear axles, a handle member and a driver's seat disposed on the vehicle body frame, left and right footsteps attached to the vehicle body frame at both sides of the engine, respectively, a front-wheel steering mechanism for interconnecting the handle member with the front wheels and steering the front wheels, a rear-wheel steering mechanism for steering the rear wheels, and a steering transmission mechanism for mechanically interconnecting the front-wheel steering mechanism with the rear-wheel steering mechanism. This vehicle is intended for off-road travelling and thus has contrivances made such as the low-pressure type balloon tires are employed for the front and rear wheels.

In the vehicle above, however, both the power and steering transmission mechanisms are disposed at one side of the engine, whereby the freedom in design of the vehicle body frame is restricted, resulting in an increased cost.

Moreover, in the vehicle above, which is of a riding-astride type, the power and steering transmission mechanisms are needed to be arranged within a transverse distance between the left and right footsteps. In this respect, to thus arrange both of the transmission mechanisms at one side of the engine, the transmission mechanisms are required to be disposed one above the other. As a result, in order to ensure the vehicle level to be higher than predetermined relative to the ground, either of the transmission mechanisms is disposed at a relatively high position.

With such points in mind, the present invention has been achieved to effectively solve problems in conventional riding-astride type whole-wheel steered vehicles.

SUMMARY OF THE INVENTION

An object of the present invention is to provide a riding-astride type whole-wheel steered vehicle, in which the weight balance between the left and right of a vehicle body is favorably kept and it is sufficiently contrived to lower the position of the center of gravity of the vehicle body.

To achieve such object, the present invention provides a riding-astride type whole-wheel steered vehicle comprising a vehicle body frame, front wheels attached through a front axle to the front part of the vehicle body frame, rear wheels attached through a rear axle to the rear part of the vehicle body frame, a midship engine mounted on the vehicle body frame between the axles in the longitudinal direction of the vehicle, a power transmission mechanism for transmitting power of the engine to at least either of the front and rear axles, a handle member and a driver's seat disposed on the vehicle body frame, left and right footsteps attached to the vehicle body frame at both sides of the engine, respectively, a front-wheel steering mechanism for interconnecting the handle member with the front wheels and steering the front wheels, a rear-wheel steering mechanism for steering the rear wheels, and a steering transmission mechanism for mechanically interconnecting the front-wheel steering mechanism with the rear-wheel steering mechanism, wherein the power transmission mechanism and the steering transmission mechanism are arranged, within a transverse distance between the left and right footsteps, at one side of the engine and at the other side thereof, respectively.

The above and further features, objects, and advantages of the present invention will more fully appear from the following detailed description of the preferred embodiment of the invention when the same is read in conjunction with the accompanying drawings.

DETAILED DESCRIPTION OF THE PREFERRED EMBODIMENT

Referring first to FIGS. 1 to 5, designated at reference numeral 100 is a riding-astride type whole-wheel steered vehicle according to a first embodiment of the present invention. The vehicle 100 includes a vehicle body frame 1 having front wheels 2, 2 suspended through front shock absorbers 2a at the right and left of the front part thereof and rear wheels 3, 3 suspended through rear shock absorbers 3a at the left and right of the rear part thereof. On the vehicle body frame 1 there is put a body cover 4 that covers the frame 1, the cover 4 having at the front and rear thereof front fenders 4f, 4f and rear fenders 4r, 4r integrally formed therewith, respectively. The front and rear wheels 2, 3 are furnished with balloon tires 2t, 3t of a very low pressure, respectively, which are adapted for offroad travelling. For the front wheels 2 and the rear wheels 3, a divided front axle 23-24 and a divided rear axle 13-14 are provided, respectively, which are both directed in the transverse direction of the vehicle.

Moreover, on the vehicle body frame 1 is mounted on midship engine 5, which is located, in terms of the longitudinal direction of the vehicle, between the front axle 23-24 and the rear axle 13-14. More particularly, the engine 5 is disposed, substantially at the middle with respect to both longitudinal and transverse directions of the vehicle, on the bottom of a central portion of the vehicle body frame 1, thus giving a lowered position to the center of gravity of the vehicle 100.

Further, off substantially to the upper rear of the midship engine 5, a driver's seat 6 of a riding-astride type is installed on the upper part of the vehicle body frame 1. At both sides of the engine 5, left and right footsteps 7, 7 are attached to the frame 1.

The engine 5 comprises a crankcase 5c, a cylinder portion 5a standing aslant from the crankcase 5c to the upper front, and a transmission case 5m integrally formed on the rear part of the crankcase 5c, and has disposed on the left side face of the transmission case 5m a gearbox 8 adapted to function as a power takeout part for taking out power of the engine 5.

Into the gearbox 8 is assembled the front end of a rear propeller shaft 11 adapted to transmit engine power to the rear axle 13-14, as well as the rear end of a front propeller shaft 21 adapted for transmission of engine power to the front axle 23-24. Both of the propeller shafts 11, 21 are extended from the engine 5 in the longitudinal direction of the vehicle, and arranged to be substantially parallel with a longitudinal centerline $L_1$ of the vehicle 100 and higher in level than the left and right footsteps 7, 7. The rear end of the rear propeller shaft 11 is assembled into a rear differential case 12, and the front end of the front propeller shaft 21, into a front differential case 22. Moreover, into the rear differential case 12 are assembled the respective inner ends of left and right rear axles 13, 14 that constitute the divided rear axle 13-14, and into the front differential case 22, the respective inner ends of left and right front axles 23, 24 that constitute the divided front axle 23-24. Further, the rear axles 13, 14 are connected at the respective outer ends thereof through universal joints 15, 15 to wheel shafts 16, 16 supported by knuckle arms 18, 18, and also the front axles 23, 24 are connected at the respective outer ends thereof through universal joints 25, 25 to wheel shafts 26, 26 supported by knuckle arms 28, 28. The aforementioned propeller shafts 11, 21 are adapted to function as engine power transmission elements to the rear axles 13, 14 and the front axles 23, 24, respectively.

Figure 1:
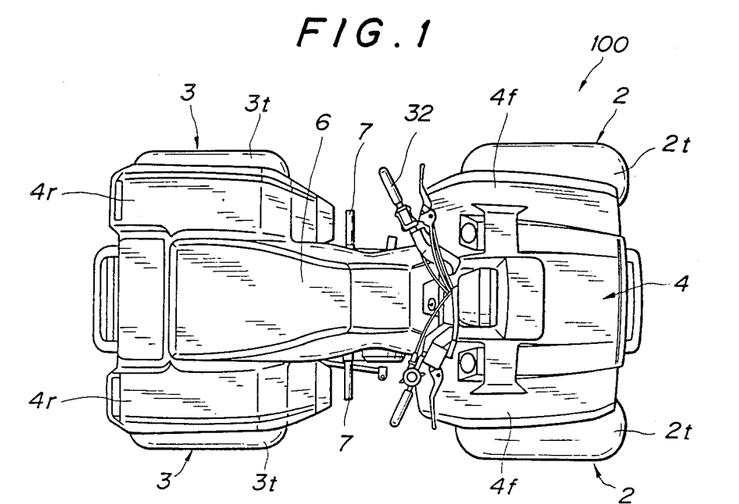
FIG. 1 is a plan view of a riding-astride type whole-wheel steered vehicle according to a first embodiment of the present invention.
Figure 2:
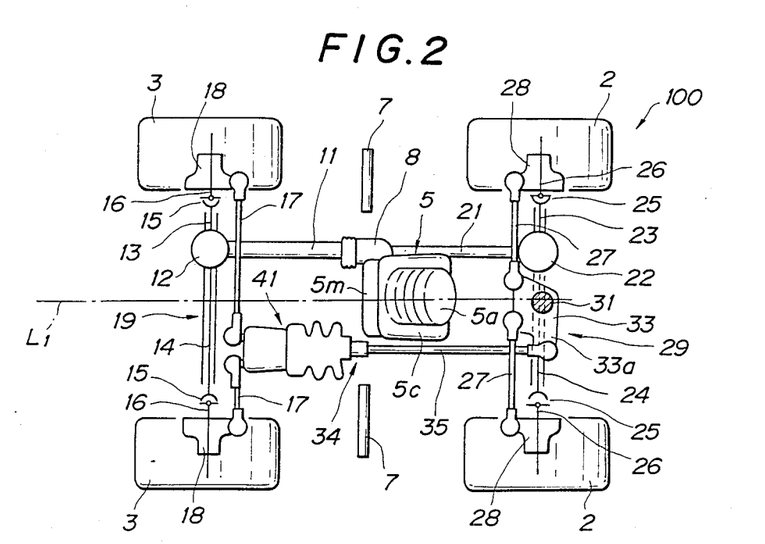
FIG. 2 is a schematic plan view showing a drive power transmission system and a steering transmission system of the vehicle.
Figure 3:
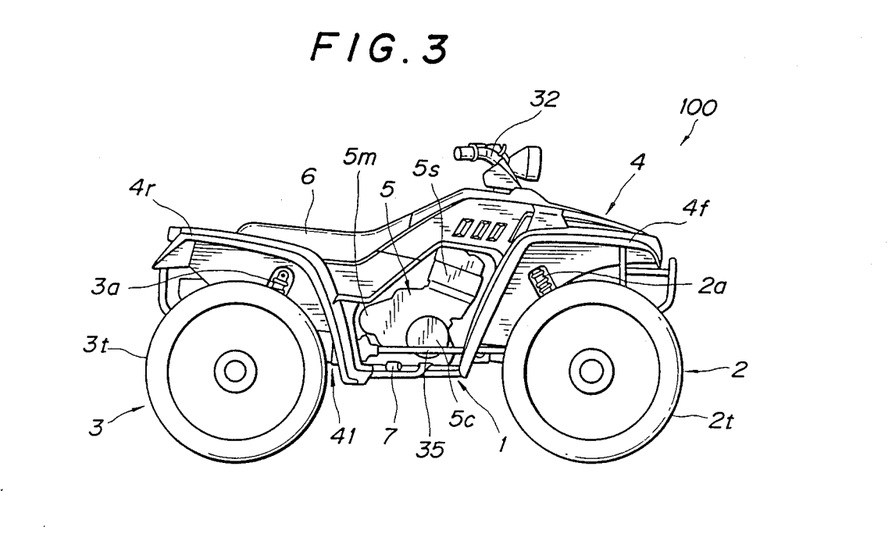
FIG. 3 is a right side view of the vehicle.
Figure 4:
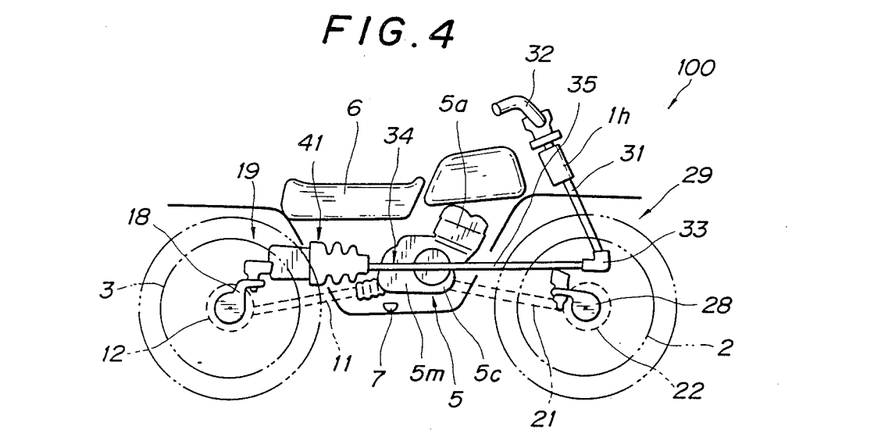
FIG. 4 is a schematic right side view of the vehicle that is similar to FIG. 2.
Figure 5:
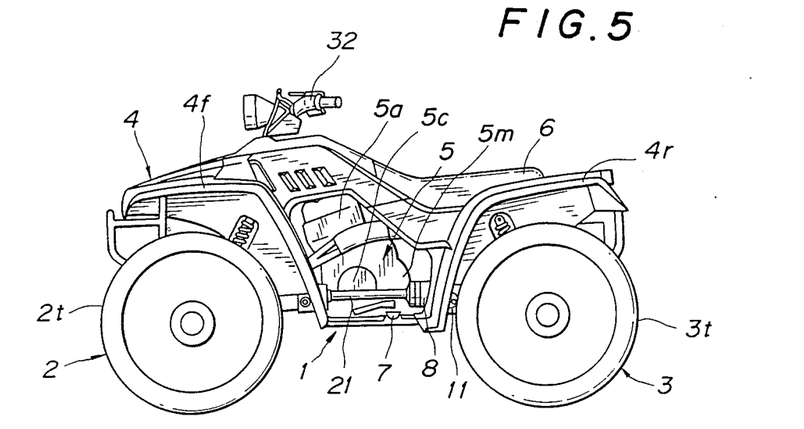
FIG. 5 is a left side view of the vehicle.

On the other hand, as shown in FIGS. 2 and 4, there is provided a mechanism for steering all of the wheels of the vehicle 100. the front end part of the vehicle body frame 1, there is disposed a head tube 1h having inserted therethrough a steering shaft 31 which is provided with a handlebar 32 fixed to the upper end thereof. The steering shaft 31 is arranged on the longitudinal centerline $L_1$ of the vehicle 100 in plan view, and has fixed to the lower end thereof a steering arm 33 of a substantially parallelogrammatic form. Then, at both ends of rear side of the parallelogram, the respective inner ends of left and right front tie-rods 27, 27 are pivotable joined to the steering arm 33, while the outer ends of the front tie-rods 27, 27 are pivotable joined to the aforementioned knuckle arms 28, 28, respectively. In the constitution above, the steering shaft 31, steering arm 33, tie-rods 27, 27, and knuckle arms 28, 28 are adapted to cooperate with each other as well as with the handlebar 32 to constitute a front-wheel steering mechanism 29.

Also at the side of the rear wheels 3, there is provided a rear-wheel steering mechanism 19 consisting of the aforementioned knuckle arms 18, 18 and left and right rear tie-rods 17, 17 which are pivotably joined at the respective outer ends thereof to the knuckle arms 18, 18, while the inner ends of the rear tie-rods 17, 17 are pivotably assembled into a rear-wheel steering angle generating mechanism 41 that will be detailed later.

The rear-wheel steering mechanism 19 is mechanically interconnected with the front-wheel steering mechanism 29 through a steering transmission mechanism 34. The steering transmission mechanism 34 comprises a longitudinal tie-rod 35 that is disposed at the right of the engine 5, in parallel with the longitudinal centerline $L_1$ of the vehicle 100, and pivotably joined at the front end thereof to a right end portion 33a of the steering arm 33, and the rear-wheel steering angle generating mechanism 41, which is disposed in the rear of the engine 5 and into which the rear end of the longitudinal tie-rod 35 is assembled. As a result, the steering transmission mechanism 34 is put in parallel relation to the aforementioned propeller shafts 11, 21. Incidentially, the longitudinal tie-rod 35 is substantially horizontarily arranged at a higher level than the footsteps 7.

Figure 6:
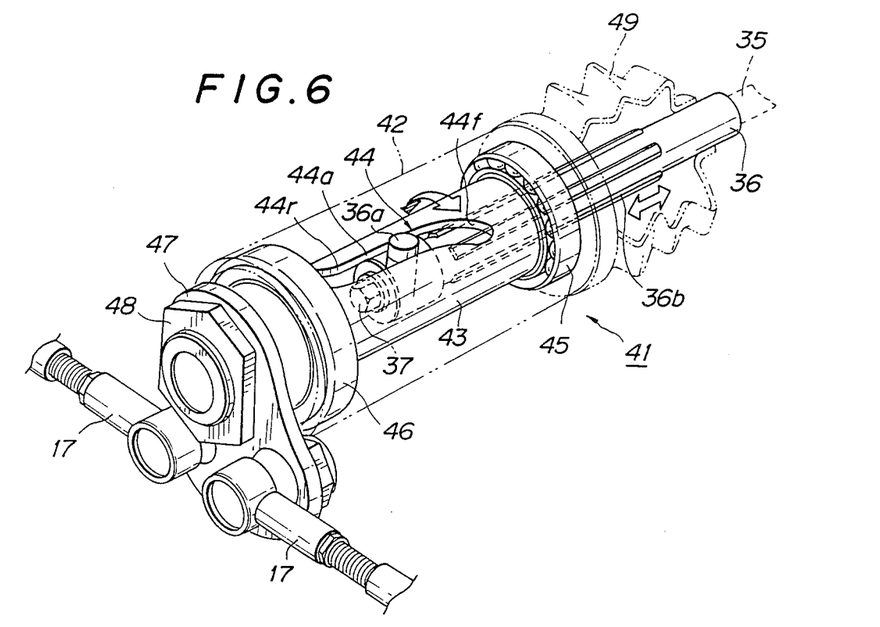
FIGS. 6 and 7 are a perspective view and a sectional plan view, respectively, of a rear-wheel steering angle generating mechanism in a steering system of the vehicle.
Figure 7:
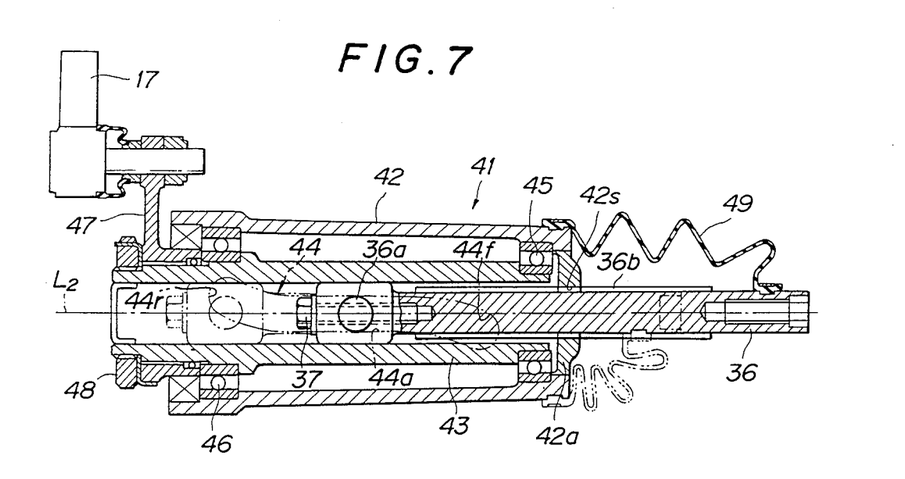

Next, referring to FIGS. 6 and 7, description will be made of the rear-wheel steering angle generating mechanism 41.

The rear-wheel steering angle generating mechanism 41 comprises a tubular case 42 fixed to the vehicle body frame 1, the case 42 having an axis $L_2$ thereof put in parallel with the longitudinal centerline $L_1$ of the vehicle 100, a tubular drum 43 supported to be coaxially rotatable relative to the case 42 by means of a pair of bearings 45, 46 fitted in the front and rear parts of the case 42, respectively, a rear steering arm 47 fitted in a splined manner on the rear part of the drum 43 that is rearwardly projected from the rear part of the case 42, and a slide shaft 36 having, at the rear end part thereof, a pin 36a projected therefrom to be perpendicular to the axis of the shaft 36 and, along the outer circumference thereof, a plurality of longitudinal splines 36b formed thereon. The pin 36a of the shaft 36 is engaged with a function slot 44 formed in the side wall of the drum 43, and the longitudinal splines 36b are engaged with corresponding splines 42s formed in the circumference of a central entry opened in a front wall 42a of the case 42.

The front end of the slide shaft 36 is fastened with, by screw-fixing thereto, the rear end of the aforementioned longitudinal tie-rod 35. Moreover, the pin 36a is fixedly anchored to the shaft 36 by means of a bolt 37 screwed through the rear end face of the shaft 36 to the inside thereof. Further, the rear steering arm 47 is fixed to the drum 43, with a nut 48 fastened on the outer circumference of the rear end of the drum 43, and joined at both sides of the lower part thereof with, by pivotably attaching thereto, the respective inner ends of the aforementioned rear tie-rods 17, 17. In this respect, in the present embodiment of the invention, the rear tie-rods 17, 17 are of a turn-buckle type and thus adapted to be adjustable of length. For the dust protection and the like, a flexible boot member 49 is stretched between the outer circumference of the front end of the tubular case 42 and that of the front part of the slide shaft 36.

With such constitution, the slide shaft 36 is adapted to be non-rotatable relative to the case 42, but straightly slidable relative thereto only in the longitudinal direction of the vehicle.

The function slot 44 comprises an intermediate straight portion 44a extending in parallel with the axis $L_2$ of the case 42, a front curvilinear portion 44f continuous to the front part of the straight portion 44a and moderately curved therefrom to the right side of the vehicle body, and a rear curvilinear portion 44r continuous to the rear part of the straight portion 44a and moderately curved therefrom to the left side of the vehicle body. With the function slot 44 of such configuration, the aforementioned pin 36a is slidably engaged.

In the foregoing arrangement, the pin 36a of the slide shaft 36 is initially set, relative to the function slot 44, so as to be found at a longitudinally central point of the straight portion 44a under the condition that the handlebar 32 is put in a neutral or original position thereof.

Consequently, as will be understood from FIG. 2, when the handlebar 32 is steered clockwise for example with an intention to turn the front wheels 2 to the right, the front steering arm 33 also rotates clockwise in FIG. 2 so that, due to corresponding actions of the front tie-rods 27, 27, the front wheels 2 are caused to rightwardly turn in accordance with the steered angle of the handlebar 32. At the same time, in correspondence with the rotation of the front steering arm 33, the longitudinal tie-rod 35 is caused to straightlinearly move in the rearward direction, keeping a parallel relation thereof to the longitudinal centerline $L_1$ of the vehicle 100, so that also the slide shaft 36 of the rear-wheel steering angle generating mechanism 41 is caused to straightlinearly move in the rearward direction of the vehicle.

In the case above, if the magnitude of rotation of the front steering arm 33 is relatively small or in other words while the turned or steered angle of the front wheels 2 is kept within a relatively small range, the pin 36a of the slide shaft 36, which is non-rotatable relative to the case 42 as described, remains in the straight portion 44a of the functin slot 44. Thus, the drum 43 is kept from rotation and, therefore, also the rear steering arm 47 makes no rotary motions. As a result, the rear tie-rods 17, 17 are both kept in original positions thereof, without moving therefrom, thus causing neither of the rear wheels 3 to be turned.

However, still in the above case, when the rotation of the front steering arm 33 has become large, exceeding a predetermined value, or if the turned angle of the front wheels 2 is in excess of a predetermined limit, the pin 36a is brought into engagement with the rear curvilinear portion 44r of the function slot 44, causing the drum 43 to clockwise rotate when viewed from the rear of the vehicle. Thus, the rear tie-rods 17, 17 are both displaced in the leftward direction of the vehicle and, therfore, the rear wheels 3 are both turned to the left, that is, in the opposite direction to the front wheels 2, in a non-linear manner.

It will be apparent from the foregoing description how the rear-wheel steering angle generating mechanism 41 funtions when the hendlebar 32 is steered with an intention to turn the front wheels 2 to the left.

It will be comprehended that the configuration of the function slot 44 may be voluntarily modified to set a desired relation between the steering direction of the front wheels 2 and that of the rear wheels 3. For example, there may well be established such a setting that the rear wheels 3 are always turned in the same direction as or in the opposite direction to the front wheels 2. Moreover, there may preferably be made such a setting that the rear wheels 3 are turned in the same direction as the front wheels 2 while the magnitude of rotation of the handlebar 32 is relatively small, but in the opposite direction to the front wheels 2 when the rotated angle of the handlebar 32 has become relatively large. Such relation of steering direction between the front and rear wheels 2, 3 may advantageously be reversed, as a matter of course. Further, in any of such modifications, also the characteristic of steering angle ratio between the front and rear wheels 2, 3 may well be voluntarily altered.

According to the present embodiment, the riding-astride type whole-wheel steered vehicle 100, which is equipped with the midship engine 5, has arranged, within a transverse distance between the footsteps 7, 7, at the left as one side of the engine 5 of power transmission mechanism (consisting of the elements 8, 21, and 11) adapted for transmitting drive power from the engine 5 to the front and rear axles 13–14, 23–24 and at the right as the other side of the engine 5 the steering transmission mechanism 34 (consisting of the elements 35, 41) interconnecting the front-wheel steering mechanism 29 with the rear-wheel steering mechanism 19. It will be seen that, in cooperation with the midship engine 5, such arrangement permits the vehicle 100 to have favorable weight balance kept between the left and right of the vehicle body.

Moreover, since the power transmission mechanism 8-11-21 and the steering transmission mechanism 34 are each respectively arranged at either side of the engine 5, it has become unnecessary to dispose either of them above the other, thus enabling them to be disposed both at relatively low levels in comparison with the case of conventional vehicles of the type described. As a result, in cooperation with the midship engine 5, it is permitted to effectively lower the position of the center of gravity of the vehicle 100.

Further, since the steering transmission mechanism 34 is disposed higher in level than the footsteps 7, 7, there can be secured a sufficient space between the mechanism 34 and the ground surface. Therefore, sufficient protection can be achieved of the longitudinal tie-rod 35 and the rearwheel steering angle generating mechanism 41 that constitute the steering transmission mechanism 34.

Still more, the rear-wheel steering angle generating mechanism 41 is composed of the slide shaft 36 adapted to be longitudinally slidable with the longitudinal tie-rod 35 that is straightlinearly movable in the longitudinal direction in correspondence with rotation of the front steering arm 33, the pin 36a projected from the slide shaft 36 at right angles, and the drum 43 which is adapted to be rotatable in dependence on longitudinal movement of the pin 36a engaged with the function slot 44 as a function generating groove formed in the drum 43 and which has the rear steering arm 47 fixed to the rear end thereof. Therefore, the rear wheels 3 are permitted to be steered by converting the longitudinal straightlinear motion of the longitudinal tie-rod 35 into a rotary motion of the drum 43, as necessary.

Figure 8:
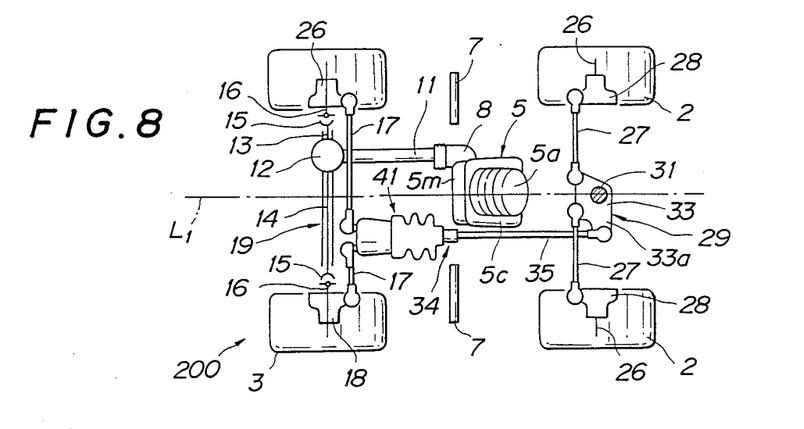
FIGS. 8 and 9 are a schematic plan view and a schematic right side view, similar to FIGS. 2 and 4, respectively, of a riding-astride type whole-wheel steered vehicle according to a second embodiment of the present invention.
Figure 9:
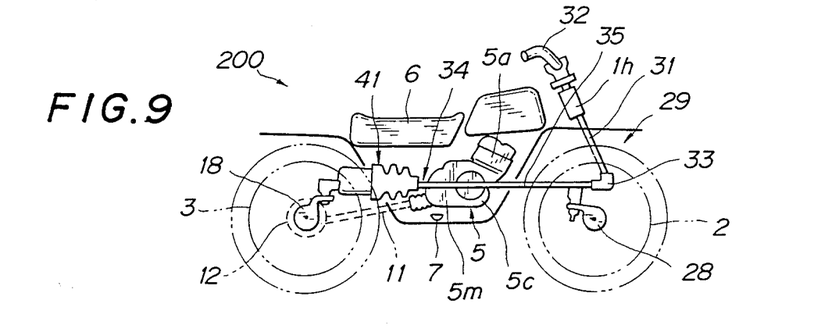

In FIGS. 8 and 9, there is shown a riding-astride type whole-wheel steered vehicle 200 according to a second embodiment of the invention, which as a whole is similar to the vehicle 100 of the first embodiment, though being modified therefrom by omitting a front-wheel drive mechanism including the elements 21, 22, 23, 24, and 25. Like parts are designated by like reference numbers.

Accordingly, also in the vehicle 200, like effects are achieved as in the vehicle 100.

Incidentially, in respect of the drive system, the vehicles 100 and 200 are both shaft driven systems. In this respect, however, it will be easily understood that the present invention may be effectivley applied also to vehicles of a chain drive system.

Although there has been described what is at present considered to be the preferred embodiment of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. A riding-astride type whole-wheel steered vehicle comprising:
   a vehicle body frame extending longitudinally between a front and a rear;
   a driver's seat disposed on said vehicle body frame;
   front wheels attached through a front axle to a front part of said vehicle body frame;
   rear wheels attached through a rear axle to a rear part of said vehicle body frame;
   a midship engine mounted on the bottom of a central portion of said vehicle body frame substantially at the middle of the vehicle with respect to both longitudinal and transverse directions of the vehicle, the engine including a crankcase, a cylinder portion standing aslant from said crankcase to the upper front, a transmission case integrally formed on a rear part of said crankcase, and a gear box disposed on one side face of said transmission case;
   a power transmission means for transmitting power of said engine to at least either of said front and rear axles and having at least a rear propeller shaft operatably interconnecting said gearbox with said rear axle;
   left and right footsteps attached to said vehicle body frame at each side of said engine;
   a handle member disposed on said vehicle body frame and being movable to steer the vehicle;
   a front-wheel steering means for steering said front wheels in response to the operation of said handle member, said front wheel means including a handle member motion to straightlinear motion convertor for converting motion of the handle member to straightlinear motion;
   a steering transmission mechanism disposed substantially in parallel with said power transmission mechanism and mechanically interconnecting said front-wheel steering mechanism with said rear-wheel steering mechanism;
   said steering transmission mechanism including,
   a rod means extending in the longitudinal direction of said vehicle and having a front end connected to said converter for transmitting a straightlinear motion in the longitudinal direction of said vehicle to a rear wheel steering angle generating means in response to the operation of said front-wheel steering mechanism, and
   a said rear-wheel steering angle generating means disposed rearward of said engine and coupled to a rear end of said rod member for converting said straightlinear motion of said rod means into a rotary motion and transmitting said rotary motion to said rear-wheel steering mechanism,
   wherein said power transmission means and said steering transmission mechanism are arranged, within a transverse distance between said left and right footsteps, at one side of said engine and at the other side thereof, respectively and the rear-wheel steering angle generating means and rear propeller shaft are symmetrically disposed on opposite sides of the longitudinal centerline of the vehicle.

2. A riding-astride type of whole-wheel steered vehicle according to claim 1, wherein:
   at least a portion of said power transmission means and said steering transmission mechanism are disposed above said footsteps.

3. A riding-astride type whole-wheel steered vehicle (100; 200) comprising:
   a vehicle body frame (1) extending longitudinally between a front and a rear;
   front wheels (2) attached through a front axle (23, 24, 26) to a front part of said vehicle body frame (1) between said axles (13, 14, 16 and 23, 24, 26);
   rear wheels (3) attached through a rear axle (13, 14, 16) to a rear part of said vehicle body frame (1);
   a midship engine (5) mounted on said vehicle body frame (1) between said axles (13, 14, 16 and 23, 24, 26);
   a power transmission mechanism (8, 11, 21) disposed on one side of the engine and transmitting power of said engine (5) to at least either of said front and rear axles (23, 24, 26 and 13, 14, 16);
   a handle member (32) and a driver's seat (6) disposed on said vehicle body frame (1);
   left and right footsteps (7) attached to said vehicle body frame (1) at each side of said engine (5), respectively;
   a front wheel steering mechanism (29) interconnecting said handle member (32) with said front wheels (2) and steering said front wheels (2);
   a rear-wheel steering mechanism (19) steering said rear wheels (2); and
   a steering transmission mechanism (34) mechanically interconnecting said front-wheel steering mechanism (29) with said rear-wheel steering mechanism (29), the steering transmission mechanism (34) comprising:
   a rod member (35) disposed at said other side of said engine (5) and extending in the longitudinal direction of said vehicle, the rod member (35) having a front end connected to the front-wheel steering mechanism (29) and making a straightlinear motion in the longitudinal direction of said vehicle in response to the steering operation of said handle member (32), and
   a rear-wheel steering angle generating mechanism (41) disposed rearward of said engine (5) and coupled to a rear end of said rod member (35), said rear-wheel steering angle generating mechanism (41) being operativley interconnected with said rear-wheel steering mechanism (19) and comprising:
   a rear-wheel steering angle responsible function generating mechanism (36, 36a, 44, 47) which converts said straightliner motion of said rod member (35) into a rotary motion and transmits said rotary motion to said rear-wheel steering mechanism (19), said rear-wheel steering angle responsible function generating mechanism (36, 36a, 44, 47) comprising a slide shaft (36) interconnected with said rod member (35) and adapted to make a straightlinear motion together with said straightlinear motion of said rod member (35), a pin (36a) projected from said slide shaft (36), and a rotary drum (43) having formed in the outer circumference thereof a function slot (44) engaged with said pin (36a); and wherein said power transmission mechanism (8,11,21) and said steering transmission mechanism (34) are arranged, within a transverse distance between said left and right footsteps (7), at one side of said engine (5) and at the other side thereof, respectively.

4. A riding-astride type whole-wheel steered vehicle (100; 200) according to claim 3, wherein:
said rear-wheel steering mechanism (19) comprises a steering arm (47) attached to said rotary drum (43), and left and right rear tie-rods (17) pivotably joined at the inner ends thereof to said steering arm (47) and at the outer end thereof to knuckles (18) of said rear wheels (3).

5. A riding-astride type whole-wheel steered vehicle (100) according to claim 3, wherein:
said power transmission mechanism (8, 11, 21) comprises a front propeller shaft (21) and a rear propeller shaft (11) forwardly and rearwardly extended from said one side of said engine (5), respectively, and operatively interconnected with said front and rear wheels (2, 3), to drive said wheels (2, 3), respectively; and
said steering transmission mechanism (34) is disposed, at said other side of said engine (5), substantially in parallel with both of said propeller shafts (11, 21).

6. A riding-astride type whole-wheel steered vehicle (100, 200) according to claim 3 wherein:
at least a portion of said power transmission mechanism (8, 11, 21) and said steering transmission mechanism (34) are disposed above said footsteps (7).

* * * * *

UNITED STATES PATENT AND TRADEMARK OFFICE
CERTIFICATE OF CORRECTION

PATENT NO. : 4,779,697

DATED : October 25, 1988

INVENTOR(S) : Hirotake Takahashi

It is certified that error appears in the above-identified patent and that said Letters Patent is hereby corrected as shown below:

Page 1, Item [22] Filed: "Jun. 11, 1996" should read --Jun. 11, 1986--.

Column 1, line 33, "the" should read --that--;

Column 3, line 52, after "vehicle 100." and before "the" insert --At--.

Column 3, line 61, "pivotable" should read --pivotably--.

Column 3, line 63, "pivotable" should read --pivotably--.

Column 5, line 37, "functin" should read --function--.

Column 5, line 57, "hendlebar" should read --handlebar--.

Column 8, line 62, "straightliner" should read --straightlinear--.

Signed and Sealed this

Twenty-fifth Day of April, 1989

Attest:

DONALD J. QUIGG

Attesting Officer

Commissioner of Patents and Trademarks